US010447430B2

(12) United States Patent
Low et al.

(10) Patent No.: US 10,447,430 B2
(45) Date of Patent: Oct. 15, 2019

(54) FORWARD ERROR CORRECTION FOR STREAMING DATA

(71) Applicant: Sony Interactive Entertainment LLC, San Mateo, CA (US)

(72) Inventors: Kim-Huei Low, Lake Forest, CA (US); Kelvin Yong, Irvine, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 279 days.

(21) Appl. No.: 15/225,508

(22) Filed: Aug. 1, 2016

(65) Prior Publication Data
US 2018/0034583 A1 Feb. 1, 2018

(51) Int. Cl.
*H04L 1/00* (2006.01)
*H04L 1/08* (2006.01)
*H04L 12/801* (2013.01)

(52) U.S. Cl.
CPC .......... *H04L 1/0041* (2013.01); *H04L 1/0002* (2013.01); *H04L 1/0045* (2013.01); *H04L 1/08* (2013.01); *H04L 47/33* (2013.01)

(58) Field of Classification Search
CPC ..... H04L 1/0041; H04L 1/0042; H04L 1/004; H04L 1/0045; H04L 1/0078;
(Continued)

(56) References Cited

U.S. PATENT DOCUMENTS 813,608 A 2/1906 Wright
5,737,337 A * 4/1998 Voith ............... H04L 1/0071
714/702
(Continued)

FOREIGN PATENT DOCUMENTS

JP 2004289621 A 10/2004
JP 2009159368 A 7/2009
(Continued)

OTHER PUBLICATIONS

Chinese Office Action for CN Application No. 201510058914.8, dated Jul. 4, 2017.
(Continued)

*Primary Examiner* — Christine T. Tu
(74) *Attorney, Agent, or Firm* — JDI Patent; Joshua D. Isenberg; Robert Pullman

(57) ABSTRACT

A current frame in a sequence and one or more previous frames in the sequence may be encoded and decoded with forward error correction (FEC). The current frame is encoded at a first bitrate to generate one or more encoded source frames and the one or more previous frames are encoded at an equal or lower second bitrate to generate one or more encoded FEC frames. The encoded source frame(s) and FEC frame(s) are packetized into one or more data packets, which are stored in a memory or transmitted over a data network. The encoded source frame information and previous frame information is unpackaged from the packets and the encoded source frames are decoded. If given source frame of the sequence is missing, one or more encoded FEC frames that correspond to the given source frame are identified from among the data packets and decoded and used to reconstruct the given frame.

24 Claims, 5 Drawing Sheets

(58) Field of Classification Search
CPC ... H04L 1/0083; H04L 1/1812; H04L 1/1816; H04L 1/1819; H04L 1/189; H04L 1/1867; H04L 47/34; H04L 65/60; H04L 65/607; H04L 9/0617
See application file for complete search history.

(56) References Cited

U.S. PATENT DOCUMENTS

| | | | |
|---|---|---|---|
| 6,584,438 | B1 | 6/2003 | Manjunath et al. |
| 7,613,979 | B1 | 11/2009 | Marr et al. |
| 8,185,805 | B2 | 5/2012 | Marr et al. |
| 8,514,225 | B2 | 8/2013 | Genova |
| 8,880,651 | B2 | 11/2014 | Nielsen |
| 2002/0136219 | A1 | 9/2002 | Ding et al. |
| 2006/0029065 | A1 | 2/2006 | Fellman |
| 2007/0157069 | A1* | 7/2007 | Lyakh .......... H04L 1/0072 714/791 |
| 2008/0134005 | A1* | 6/2008 | Izzat .......... H04L 1/0009 714/774 |
| 2009/0092152 | A1 | 4/2009 | Rajakarunanayake et al. |
| 2010/0020713 | A1 | 1/2010 | Frankkila |
| 2011/0110260 | A1 | 5/2011 | Yoneda et al. |
| 2011/0243052 | A1 | 10/2011 | Alay et al. |
| 2012/0046956 | A1 | 2/2012 | Stewart et al. |
| 2015/0222555 | A1 | 8/2015 | Rickeby et al. |

FOREIGN PATENT DOCUMENTS

| | | |
|---|---|---|
| JP | 2010016722 A | 1/2010 |
| JP | 2010233192 A | 10/2010 |

OTHER PUBLICATIONS

Final Office Action for U.S. Appl. No. 14/174,747, dated Dec. 16, 2016.
Final Office Action for U.S. Appl. No. 14/174,747, dated Feb. 3, 2016.
International Search Report and Written Opinion dated Nov. 21, 2017 for International Patent Application PCT/US2017/044229.
International Search Report and Written Opinion for International Application No. PCT/US2015/013351, dated May 21, 2015.
Non-Final Office Action for U.S. Appl. No. 14/174,747, dated Jul. 28, 2016.
Non-Final Office Action for U.S. Appl. No. 14/174,747, dated Sep. 11, 2015.
Notification of Reasons for Refusal dated Aug. 29, 2017 for Japanese Patent Application No. 2016-550269.
Office Action dated Jan. 22, 2018 for Chinese patent application 201510058914.8.
Notice of Allowance dated Feb. 6, 2018 for U.S. Appl. No. 14/174,747.

* cited by examiner

FORWARD ERROR CORRECTION FOR STREAMING DATA

FIELD

The present disclosure relates to data transport over a network. In particular, aspects of the present disclosure related to systems and methods for congestion control using unreliable transport protocols in a packet switched network.

BACKGROUND

With the increasing prevalence of digital streaming services and various cloud-based computing solutions, the ability to quickly and accurately transfer large amounts of data between remote devices is a critical task. Sending digital data to a destination system through shared resources of a network, such as the internet, a wide area network (WAN), or local area network (LAN), typically involves the arrangement of data into formatted blocks, known as packets, which may have fixed or variable length. Each data packet typically includes a payload, or body, which has the fundamental user data being delivered to the destination, as well as certain supplemental information used for routing and control purposes, which commonly contained at least partially within a header of the data packet. Broadly speaking, the network, sending systems, and receiving systems may use this supplemental information to ensure proper routing and delivery of the payload to the intended destination.

An often unavoidable consequence of transporting data over a packet switched network in this manner is packet loss, which occurs when one or more data packets fail to properly reach their destination. Packet loss can arise due to a variety of factors, including channel congestion, signal degradation, and other reasons. In order to prevent certain network conditions which cause packet loss to occur, while also efficiently using the available bandwidth in a network channel, a variety of error correction techniques have been developed. Moreover, there are a range of transport protocols which may incorporate tools to handle packet loss, and the particular method used to handle packet loss when it does occur depends on the particular transport protocol used during data transfer. Generally speaking, these transport protocols can be classified under two types, reliable protocols and unreliable protocols, which each present certain tradeoffs, and the particular choice of protocol used in any instance may depend on the nature of the data transfer.

Reliable protocols incorporate guarantees that each data packet is delivered to its destination in sequence, retransmitting dropped packets in the event of packet loss. Reliable protocols are often, but not always, connection-oriented protocols and delivery guarantees are typically accomplished by establishing a backchannel from the recipient back to the sender for a particular communication session, which the recipient may use to send some type of acknowledgement receipts to verify that packets were delivered properly. The sender may use these acknowledgments to guide the retransmission process when it is indicated that data packets failed to properly reach their destination. A prevalent and well-known example of a reliable protocol is Transmission Control Protocol (TCP), which is also connection-oriented. Reliable protocols, such as TCP, are well suited to tasks where accurate transfer of data is a chief concern and some amount of delay can be tolerated in the interests of verifying data packets are delivered properly, such as sending text based emails, digital content downloads, and media streaming services in which audio/video can be buffered at the destination system. Unfortunately, the data verification properties and retransmission of data introduces a comparatively large overhead, rendering many reliable protocols undesirable for time-critical applications, including real-time data transfer, such as live audio and/or video streaming, online video gaming, and internet telephony.

Unreliable protocols, by contrast, generally forgo the type of data delivery verifications for particular packets as described above, and are generally characterized by the fact that they do not guarantee that each packet reaches its destination, nor do they ensure that the packets are delivered in the proper sequence. Unreliable protocols are often, but not always, connectionless, and typically do not establish a fixed channel during any particular communication session. Each data packet may instead be routed independently based on the supplemental information contained in each data packet. A prevalent and well-known example of an unreliable protocol is User Datagram Protocol (UDP), which is also connectionless. Since unreliable protocols like UDP have comparatively reduced overhead by forgoing the reliability properties mentioned above, they are better suited for time sensitive applications where minimizing latency is a chief concern, such as the real-time applications mentioned above.

Since unreliable protocols generally forgo retransmission of data packets, a technique known as forward error correction (FEC) is commonly used to handle packet loss when transporting data using an unreliable service. FEC provides the recipient device with the ability to independently reconstruct lost data without the need for the sender to retransmit source packets which fail to be delivered properly. When forward error correction is used, the original source data is typically redundantly coded at the sender side in the form of FEC packets, which are transmitted to the recipient concurrently with the source packets. In the event of a lost source packet, the recipient device may utilize the redundantly coded data contained in the FEC packets to reconstruct the lost data without having to wait for retransmission.

Among types of loss, unreliable protocols and connections such as WiFi are particularly vulnerable to so-called bursty loss, where connection is lost for periods on the order of 50 milliseconds. Existing methods of forward error correction include Reed-Solomon FEC, in which two Reed-Solomon coded versions of a given source frame are sent as FEC frames within 10 milliseconds of the source frame being sent. Reed-Solomon coding allows for reconstruction of the original source frame at the same resolution. If connection loss takes place over 10 milliseconds or more, however, both the source frame and the FEC frames could be lost. No interruption occurs if either the source or the FEC frames are lost, however, losing both will make reconstruction impossible. Thus, while previous methods can help correct connections lost for very short periods of time, there is a need for error correction that can handle longer bursts of interruption.

Importantly, network conditions often vary over time, causing the maximum bitrate available to a sender over a network channel to vary based on present load on the channel. When a sender system attempts to send data packets at a bitrate that exceeds the current available bandwidth of the channel, it can cause congested conditions which trigger severe packet loss in response. This might be tolerable in less time-sensitive applications involving reliable data transport such as TCP, since retransmission of the lost data is guaranteed; however, this may be unacceptable in many real-time applications and other applications involving unreliable transport, as the packet loss may be to such an extent that the recipient is unable to reconstruct the loss data, causing undesirable consequences such as dropout of the signal. On the other hand, when the maximum available bitrate instead far exceeds the bitrate offered by the sender, this is also undesirable, as the full transmission capabilities of the network channel are inefficiently utilized, and the quality of the signal at the recipient side may be unnecessarily poor as a result. Error correction thus must be able to dynamically adjust to network conditions to ensure effective coverage of packet loss while not creating new packet loss by so many error correction packets that bandwidth capacity is exceeded.

Unfortunately, it is a significant challenge to transfer data using an unreliable protocol in a way that efficiently utilizes the available bandwidth of a network channel without causing congested conditions that result in unacceptable packet loss. Traditional congestion control techniques are often only suitable for reliable protocols, such as TCP, which have feedback to the sender built in to the transport layer, but are ineffective for many unreliable protocols, such as UDP, which typically lack the needed feedback unless independently added over the transport layer by the user. Moreover, while packet loss resulting from increasing the bitrate to the point of congestion might be tolerable in less time-sensitive applications, which use TCP or other reliable protocols to retransmit data, it may be unacceptable in many real-time applications due to a resulting inability of the recipient to reconstruct the data.

Accordingly, there is a need in the art for dynamic forward error correction and effective congestion control and congestion avoidance techniques which are suitable for use with UDP and other unreliable transport protocols that experience periodic and bursty loss. It is within this context that aspects of the present disclosure arise.

SUMMARY

In accordance with certain implementations of the present disclosure, a method for encoding and transmitting frames may include receiving or generating a plurality of unencoded frames including a current frame in a sequence and one or more previous frames in the sequence.

The current frame is encoded at a first bitrate to generate one or more encoded source frames. The one or more previous frames are encoded at a second bitrate that is equal to or lower than the first bitrate to generate one or more encoded FEC frames. The one or more encoded source frames and the one or more encoded FEC frames are packetized into one or more data packets, which can be stored in a memory or transmitted over a data network. The one or more data packets may be part of a stream of data packets that may include some packets that do not include encoded FEC data.

In accordance with certain implementations of the present disclosure, a sender computing system may include at least one processor unit, and at least one memory unit coupled to the at least one processor unit. The at least one processor unit and the at least one memory unit may be configured to perform the above-described encoding and transmitting method.

In accordance with certain implementations of the present disclosure, a non-transitory computer readable medium may computer readable instructions embodied therein. The computer readable instructions may be configured to implement the above-described encoding and transmitting method when executed.

In accordance with certain implementations of the present disclosure, a method for decoding and reconstructing data packets may include receiving a plurality of data packets, each of which contains encoded information corresponding to a source frame in a sequence encoded at a first bitrate and one or more previous frames in the sequence encoded as forward error correction (FEC) frames at a second bitrate that is equal to or lower than the first bitrate. The encoded information corresponding to the source frame(s) and more previous frame(s) is unpackaged from each data packet in the plurality. The one or more encoded source frames are decoded to generate one or more decoded source frames. A determination is made as to whether encoded information corresponding to a given source frame of the sequence is missing from the plurality of data packets. One or more corresponding encoded FEC frames in the plurality of data packets that correspond to the given source frame are identified and decoded to generate one or more decoded FEC frames. A reconstructed frame corresponding to the given source frame is then generated using the one or more decoded FEC frames. The decoded source frame(s) and the reconstructed missing frame can then be stored in a memory and/or presented in the sequence with a display.

In accordance with certain implementations of the present disclosure, a receiver computing system may include at least one processor unit, and at least one memory unit coupled to the at least one processor unit. The at least one processor unit and the at least one memory unit may be configured to perform the above-described decoding and reconstructing method.

In accordance with certain implementations of the present disclosure, a non-transitory computer readable medium may computer readable instructions embodied therein. The computer readable instructions may be configured to implement the above-described decoding and reconstructing method when executed.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
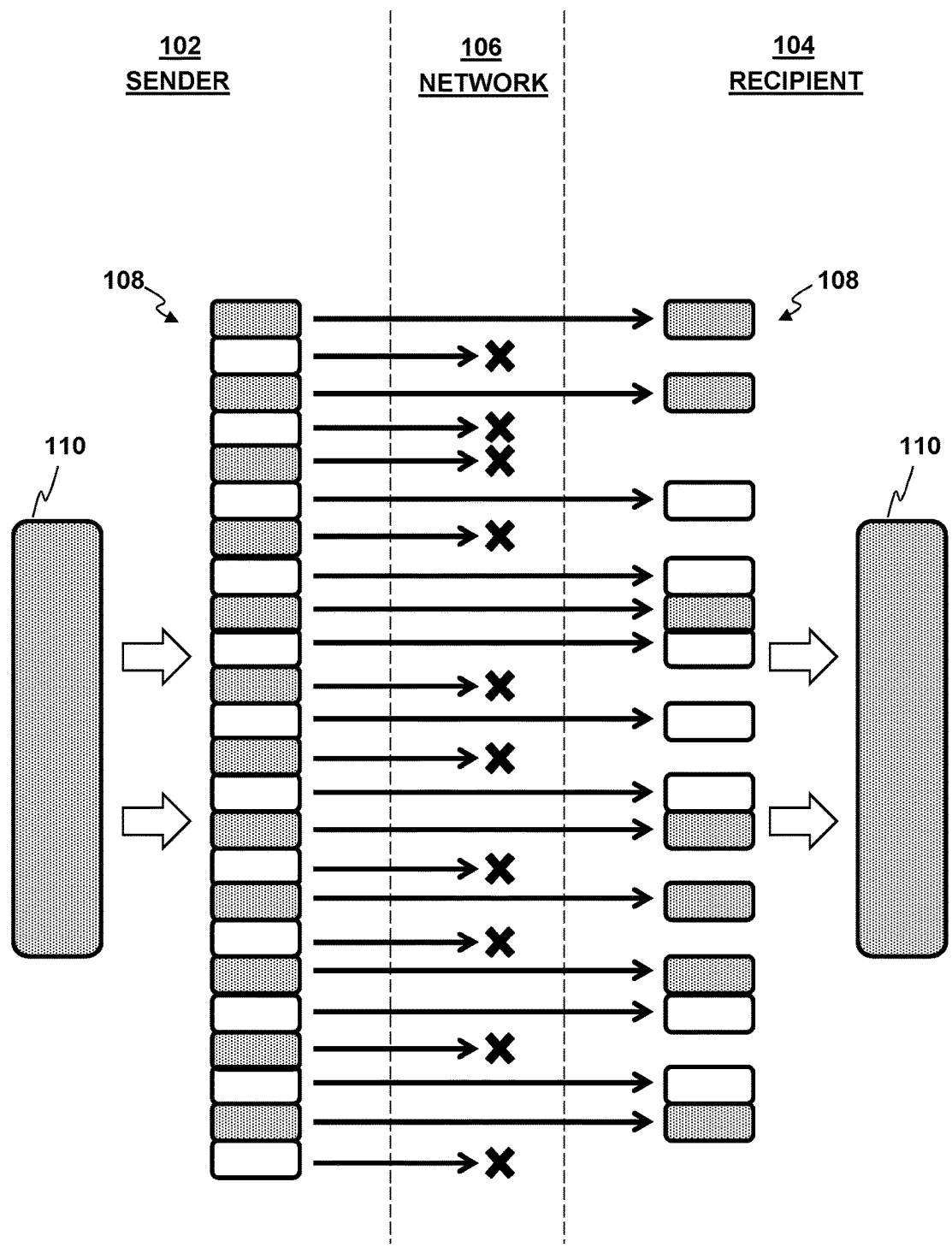
FIG. 1 is a schematic diagram of an example data transport and forward error correction technique in accordance with certain aspects of the present disclosure.

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

Introduction

Aspects of the present disclosure relate to using specially-packaged source frames and FEC history frames to compensate for bursty packet loss, which may be used with an unreliable transport protocol, such as UDP. In particular, WIFI connections are vulnerable to bursts of packet loss. For a given current frame, previous frames are encoded by a second, separate codec at a lower bitrate and sent along with the current frame. These previous frames are referred to as FEC frames. Using lower bitrate for FEC frames mitigates the additional bandwidth requirements for transmitting the packet. If the source frame is lost, the FEC frames are used to reconstruct the source frame. While reconstructed or decoded FEC frames may have lower resolution than the source frame, if the need for reconstruction is intermittent (e.g., disruptions at intervals of less than 50 milliseconds in the case of audio), the difference between source and reconstructed bitrates will be below the threshold of human perception. Thus, the FEC frames will not degrade the overall perceived quality. The number and bitrate of FEC frames sent along with each UDP packet can be tuned to change perceived audio quality or bandwidth requirements. The UDP packet header may contain relevant information about the source frame bitrate and sequence ID, as well as the bitrate and IDs for FEC frames.

In accordance with certain aspects, one or more sender devices may send data packets to one or more recipient devices using an unreliable transport protocol, such as UDP. The data packets may include both encoded source frames, containing the desired source data, as well as encoded FEC frames, containing redundancies of the source data from previous frames for forward error correction in the event that one or more of previous source packets in the stream fail to reach the one or more recipient devices. Periodic feedback reports may be sent from the one or more recipient devices to the one or more sender devices. The feedback reports may identify packet loss during the corresponding period of time, and the sender may use the feedback reports to identify whether packet loss occurred during the period of time and/or to identify an extent of packet loss during the corresponding period of time. Such feedback can be useful to determine the approximate interval of bursty packet loss.

In accordance with certain aspects, the one or more sender devices may use periodic feedback reports to adjust aspects of a bitrate of data packets in a stream sent to the one or more recipient devices. Aspects of the bitrate may be adjusted in a manner that optimizes the ability of the recipient device to obtain the source data. In certain aspects, in response to a feedback report which indicates that packet loss is within an acceptable level, a bitrate of FEC packets may be increased, while maintaining a concurrent bitrate of source packets in the stream in response to the initial feedback report. In accordance with certain aspects, because the bitrate may be adjusted by increasing only the number of FEC packets used for error correction, the one or more recipient devices may be able to reconstruct the source data even if the increase in bitrate results in congestion and increased packet loss. For example, because the ratio of FEC packets to source packets may be increased, FEC packets are likely to be successfully delivered in sufficient numbers to reconstruct data lost due to loss of source packets during delivery.

Further Details

Turning now to FIG. 1, an illustrative example of a data transport and forward error correction (FEC) technique is depicted in accordance with certain aspects of the present disclosure. In the example of FIG. 1, one or more sender devices 102 may send data to one or more recipient devices 104 over a network 106, and the data may be transmitted in the form of a plurality of data packets 108. The data packets 108 may be datagrams sent using an unreliable protocol, such as UDP, in which neither delivery of each packet 108 nor delivery of the packets 108 in order is guaranteed by the protocol. Accordingly, in the event of packet loss, the sender device 102 does not retransmit the lost pockets; rather, the recipient device 104 may attempt to reconstruct the lost source data using redundancies encoded into the data stream by the particular FEC technique used.

As shown in FIG. 1, the data packets 108 may include both source packets (shaded boxes in FIG. 1) which contain the original source data 110 being delivered to the recipient device 104 and FEC packets (white/blank boxes in FIG. 1), which are parity packets containing information that allows it to take the place of any lost source packet as long as there are enough other source or parity packets available. The FEC packets may contain redundancies of the original source data 110 and may be used by the recipient device 104 to reconstruct the source data 110 in the event that one or more of the source packets fail to properly reach the recipient 104, e.g., because they are dropped by the network 106. In certain implementations in which the transmitted data includes an audio and video stream, the data packets 108 may further include both audio packets and video packets of both of the aforementioned types, e.g., the data packets 108 may include audio source packets, audio FEC packets, video source packets, and video FEC packets, and the audio packets may generally be smaller (i.e., contain lesser amounts of data) than the video packets. Specifically, audio packets can also include stereo source packets, stereo FEC packets, 5.1 surround sound source packets, 5.1 surround sound FEC packets, or audio packets for other audio systems.

In certain implementations, the source data 110 may be a data stream that is transmitted to the recipient device 104 in real-time, and the source data 110 may be generated by an application running on the sender device 102. In such implementations, the real-time source data 110 may be made up a plurality of frames of data output in sequence, and the frames may be defined by an application which generates the source data. For example, the source data 110 may be a real-time audio/video (A/V) stream output from an application running on the sender device 102, such as a video game, video telephony program, or other A/V source program, and the application may define each frame.

In the example of FIG. 1, the illustrated block of source data 110 may correspond to a single frame, e.g., a single A/V frame, for which a plurality of source packets and FEC packets are generated and transmitted over the network 106 to the recipient device 104. The stream of data may be made up of a plurality of frames 110, which may be generated in a sequence at the sender device 102, and the plurality of data packets 108 may be formed for each frame for transmission to the recipient device 104.

It is noted that, when the data is transmitted using UDP or another unreliable protocol, the data packets 108, e.g., datagrams, may be routed by the network 106 through different respective paths and may arrive at the recipient device out of sequence. In order to facilitate reconstruction of the data at the recipient device 104, each of the data packets 108 may be stamped by the sender device with certain identifying information. For example, each data packet 108 may be stamped with a frame identifier, e.g., a frame number, indicating to which frame in the sequence that the data packet belongs, as well as a sequence identifier, e.g., a sequence number, indicating wherein in the sequence within each frame (and/or across frames) the data packet belongs. Accordingly, the sender device 102 may increment the sequence number for each new data packet formed and may increment the frame number of the data packets for each new frame formed. Optionally, the data packets 108 may also be stamped with further identifying info, such as a type identifier that identifies, e.g., whether a packet is an audio or video packet in implementations where the data stream is a real-time data stream having both an audio and a video component. The data packets 108 may also contain metadata, e.g., information about the frame's properties such as the bitrate of the source frames, bitrate of the FEC frames, and which encoded frame in a payload corresponds to the source frame and which encoded frame within the payload corresponds to a FEC frame. Such metadata may be included in the headers of the data packets 108. The recipient device 104 may assemble the data in accordance with this supplemental information stamped to each packet, and may decode the data accordingly, e.g., for presentation to an end-user at the recipient side.

In the event of packet loss in which one or more of the source packets are dropped by the network 106 or otherwise fail to reach their destination, the recipient device 104 may utilize the redundantly coded FEC parity packets to reconstruct the source data 110 without retransmission by the sender device 102, as shown in FIG. 1. It is noted that any number of FEC parity packets can be generated from one or more source packets using different algorithms. In certain implementations, the FEC data may be generated using an erasure code. In certain implementations, the error correction scheme may be such that, for each source packet that fails to reach the recipient, one FEC packet may be needed to reconstruct the particular set of data. For example, for a particular frame of data that is delivered to the recipient device, the FEC technique may be one in which, in order to fully reconstruct the frame in the event of packet loss, the number of FEC packets which properly reach the recipient device needs to be at least equal to the number of lost source packets. Otherwise, the frame may be corrupted. In other words, if N source packets exist and M parity packets were generated, then source data can be recovered when at least N total packets (source and parity) are received. In the illustration of FIG. 1, the number of source packets sent by the sender is equal to the number of FEC packets sent, i.e., the ratio of source packets to FEC packets transmitted by the sender 102 is simply 1:1, for simplicity of illustration. However, it is noted that many other ratios may be used, and that the ratio of source packets to FEC packets may be dynamic and change over time during a stream in accordance with certain aspects of the present disclosure, as described below.

In order to optimize how efficiently the available bandwidth is utilized during the data transfer, as well as avoid overloading the network channel in a manner that would trigger unacceptable packet loss, the sender device 102 and/or the recipient device 104 may be configured to implement a congestion control algorithm in accordance with aspects of the present disclosure.

Figure 2:
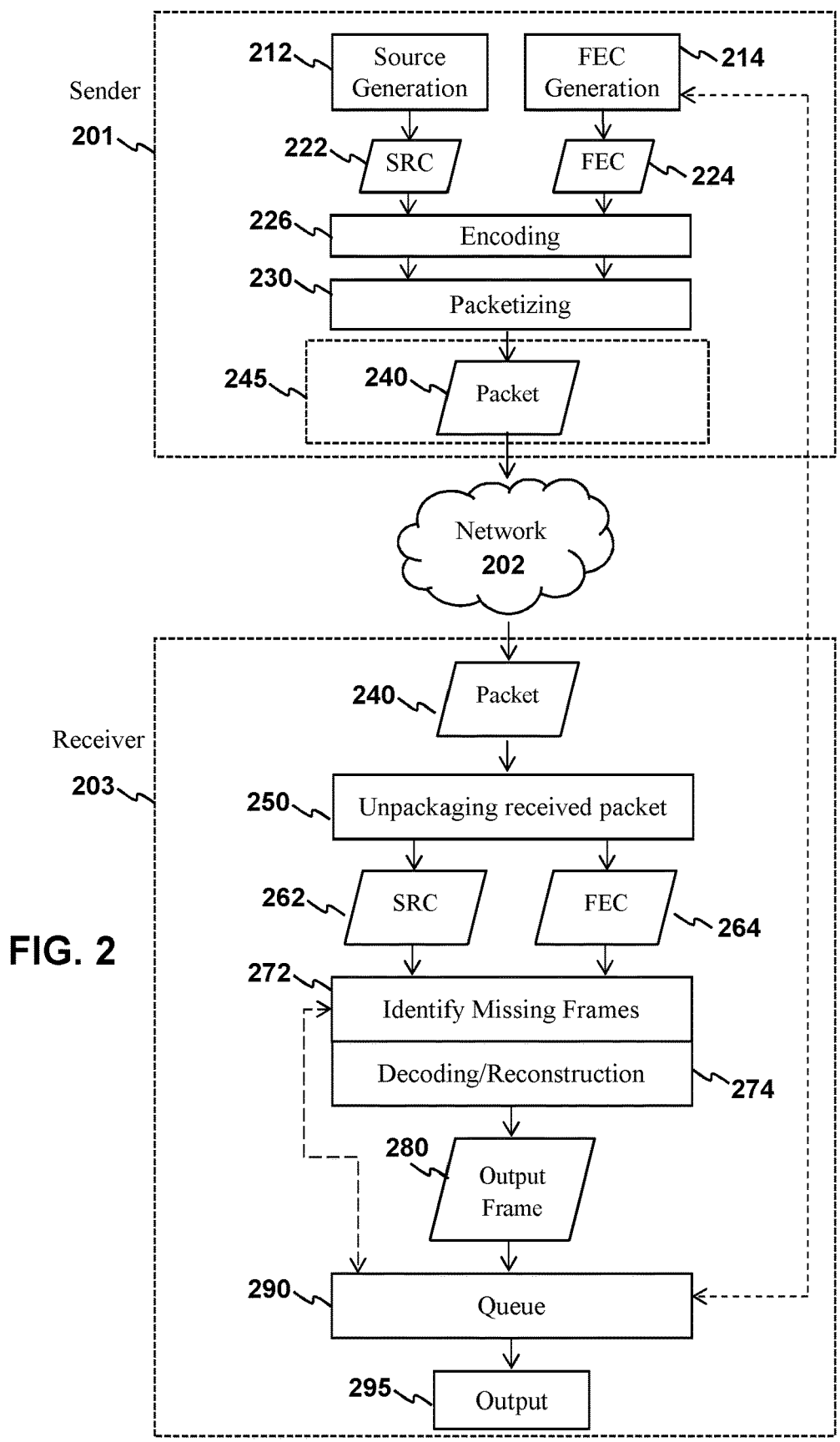
FIG. 2 is a flow diagram of an example error correction technique in accordance with certain aspects of the present disclosure.

FIG. 2 depicts an example of an overall process flow for forward error correction in accordance with aspects of the present disclosure, starting from what occurs at the sender 201, across the network 202, to the receiver 203. First on the sender side 201, a source frame generator 212 and FEC frame generator 214 respectively create one or a set of source frames 222 and FEC frames 224. In various implementations, the data intended to be encoded into the source frames 222 and FEC frames 224 may include audio data, video data, a control input stream of a game system or other sequences of data that may need to be transmitted or stored. More specifically, the frames may include audio source data, audio FEC data, video source data, and video FEC data, and the audio data may generally be smaller (i.e., contain lesser amounts of data) than the video data. Additionally, audio data may include stereo source data, stereo FEC data, 5.1 surround sound source data, 5.1 surround sound FEC data, or audio data for another audio system.

The source frames 222 and FEC frames 224 are then encoded as indicated at 226. By way of example, and not by way of limitation, the computer system on the sender side 201 could implement two instances of the same codec to encode the source frames 222 and FEC frames 224. One could also implement the disclosed using two separate hardware codecs, two separate software codecs, a combination of hardware codec and software codec for source frame and FEC frame generation respectively, or vice versa. Additionally, there could be further combinations of codecs that those skilled in the art could create that would be consistent with these teachings.

The encoding process at 226 encodes the source frames 222 at a higher bitrate than the FEC frames 224. The smaller bitrate for the FEC frames reduces the amount of data used to send the encoded source and FEC frames. The ratio of source frame encoding bitrate to FEC frame encoding bitrate depends on the worst acceptable quality for the decoded frames on the receiving side. For example, if the source bitrate is 64 kbps, and the content is low quality speech, the FEC bitrate can go down to 16 kbps. If the source bitrate is 128 kbps for the same case, FEC bitrate could still be 16 kbps and the ratio becomes 8:1. By way of example, and not by way of limitation, the ratio of the source frame bitrate to the FEC frame bitrate may be between about 1 and about 10 or between about 1.5 and about 8. Other ratios are possible and within the scope of the teachings of the present disclosure.

Next, the sender system 201 subjects the encoded source frames and FEC frames to a packetizing process 230 that packetizes the encoded frames into one or more data packets 240 for transmission over a network 202. The one or more data packets 240 include encoded data corresponding to one or more source frames 222 and one or more FEC frames 224. The data packets can in certain implementations be Uniform Datagram Protocol (UDP) packets. The disclosed invention also applies to other packetizing protocols one skilled in the art can utilize in implementing elements of the disclosed. Additionally, certain implementations of the data packet 240 can further include identification information to allow for the receiver to correctly sequence the packets 240 received. The identification information can include but is not limited to a sequence identifier or number for the encoded source or FEC frames within the payload, a number of encoded FEC frames in a payload of the given data packet, the bitrate of the source frames, the bitrate of the FEC frames, information identifying which encoded frame or frames in the payload corresponds to the source frame, or information identifying which encoded frame or frames within the payload corresponds to a FEC frame. Further, this identification information can be placed in the header of the packet 240. Furthermore, one skilled in the art could use another identification scheme to determine the order of the frame that would be consistent with the teachings of the present disclosure.

The bitrate of the source frame codec can be higher than that of the FEC frame generator codec. In the particular case of audio, one can have the source frame codec operate at a bitrate of 64 kilobits per second while the FEC frame codec operate at a bitrate of 16 kilobits per second. This would allow approximately 4 FEC frames to take the same amount of data in a packet as 1 source frame. Further, in certain implementations, the bitrate and number of FEC frames packetized per source frame in the data packets 240 can be dynamically adjusted to compensate for varying periods of bursty loss. One particular way to implement dynamic adjustment in the number of FEC frames would be to have the number of FEC frames added to a given packet match the number of frames needed to cover missing frames due to a period of bursty loss. The feedback can come in the form of returning packets from the receiver 203 back to the sender 201.

By way of example and not by way of limitation, the receiver system 203 may analyze packet sequence metadata in the received packets to identify lost packets and track packet loss as a function of time. Bursty packet loss may be identified from sharp increases in packet loss over relatively short periods of time but occurring and more or less regular intervals of time. The receiver system can aggregate packet loss data over some window of time, determine an average interval between instances of spikes in packet loss and/or a duration of such spikes, and send such information back to the sender system 201. The sender system can then use the average packet loss information to adjust the bitrates for encoding the source frames 212 and FEC frames 214. The sender may also use this information to adjust the number of FEC frames packetized per source frame in the data packets 240.

Burst loss length may be detected by looking at the sequence numbers of the source frames on the receiver side. As a numerical example, if source frame N and source frame N+4 are received, but nothing else in between, then the burst loss length is 3 frames, or 30 ms if each frame is 10 ms. As noted above, the receiver system 203 may average the bursty loss duration over some window of time and send the average bursty loss duration determined for the window back to the sender system 201. The sender system may then adjust the encoding bitrates for source and FEC frames accordingly. The bitrates may also be adjusted based on the total available bandwidth and the desired number of FEC frames. For example, if there are 200 kbps of available bandwidth between the sender 201 and receiver 203 for FEC frames, and the desired number of FEC frames changes from 4 to 5, the sender may change the bitrate for encoding FEC frames from 50 kbps to 40 kbps.

Before the packets 240 are sent over the network, 202, they may be temporarily stored in a memory buffer 245. While FIG. 2 specifically depicts transmission of the encoded data over a network 202, the disclosed also encompasses implementations where the packets 240 are stored in some form of memory other than a temporary buffer 245 such as a hard drive, CD, flash drive, or other forms of memory rather than being transmitted. The present disclosure also encompasses implementations where the data packets 240 are both stored in memory and also transmitted across a network 202.

Transmission over the network 202 can include any form of wireless communication including WiFi. As depicted in FIG. 1, transmission over a network 202 can be periodically unreliable, and so not all packets 240 sent may subsequently arrive at the receiver 203. In particular, wireless communication can be susceptible to bursty loss, wherein multiple packets in a sequence are lost. This loss describes interruptions in transmission on the order of 50 milliseconds. As discussed elsewhere in the disclosure, existing forward error correction methods include Reed-Solomon correction, which is not as robust during occurrences of bursty loss.

When a packet reaches the receiver 203, it may be unpackaged, as indicated at 250 into encoded source frame data 262 and encoded FEC frame data 264. In aspects of the present disclosure, the encoded frame data 262 and 264 may undergo an unpackaging process 270 where the frame data is analyzed and compared with a queue 290 of previously received frames to identify if any frames in a sequence are missing. Whether a frame is missing or not can be determined by examining a known or determinable sequence number or some other identification associated with each frame. Identification information can then be used to determine its position in the queue 290. This could be implemented with a comparison of identifying features or sequence number to frames already in queue 290. Furthermore, one skilled in the art could use another identification scheme to determine the order of the frame that would be consistent with the teachings of the present disclosure.

Received source frame data 262 and/or FEC frame data 264 may be decoded during a decoding/reconstruction process 274. Any source frames that are missing from the queue 290 may be reconstructed by a decoding/reconstruction process 274 from decoded FEC frame data 264. Generally, the source frame data 262 is decoded immediately after repackaging and added to the queue 290 as an output frame 280. However, it is not necessary to immediately decode the FEC frame data in each received packet 240. Instead, encoded FEC frame data may be stored in in a buffer and decoded as needed to provide one or more FEC frames suitable for reconstructing missing source frames as needed. Alternatively, the FEC frame data 264 may be decoded after they are unpackaged and the resulting FEC frames stored in a buffer until they are needed. The receiver system may remove FEC frames from the buffer as corresponding source frames are received and decoded. The FEC frames may be added to the queue 290 as output frames 280 to replace corresponding missing source frames. From the queue 290, output frames 280 are then sent as output 295, e.g., to be stored in a memory and/or presented by an output device such as an audio or video display, or otherwise used, e.g., as control input for an application such as a video game. It is noted that FEC frame data is only decoded as it is needed, i.e., not every FEC frame that is received needs to be decoded.

As stated elsewhere in this disclosure, the implementation shown in FIG. 2 can be applied to a stream of unencoded video data. Generally, video frames can be compressed into one of three types: I-Frames, P-Frames, and B-Frames. I-Frames, or intra-coded pictures, are fully specified frames that are the least compressible. P-Frames, or predicted pictures, contain information about changes from the previous frame. Finally, B-Frames, or bi-predictive pictures, contain information about changes between frames. The latter two types of frames require other types of frames to be decoded. In an implementation for video error correction, the disclosed invention would be particularly effective when a video stream has minimal bandwidth constraints, minimal loss of I-Frames, relatively low interframe movement, and is subject to bursty loss.

Additionally, the method depicted in FIG. 2 also can be applied to the input stream of a game. Particularly, an implementation of the disclosed invention would provide robust protection against bursty loss for an encoded game interface input stream. One skilled in the art could incorporate the methods of the disclosed invention in applications of other data streams over unreliable networks which may experience bursty loss.

Figure 3A:
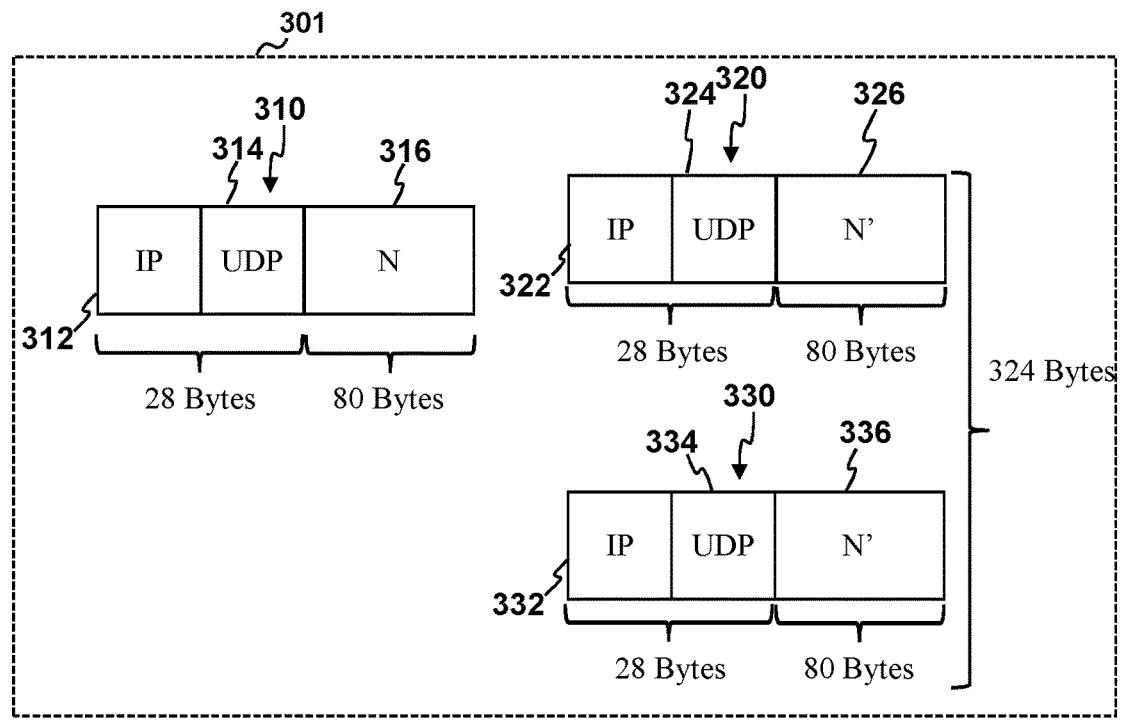
FIG. 3A is a block diagram illustrating a structure of data packets according to an extant forward error correction method.
Figure 3B:
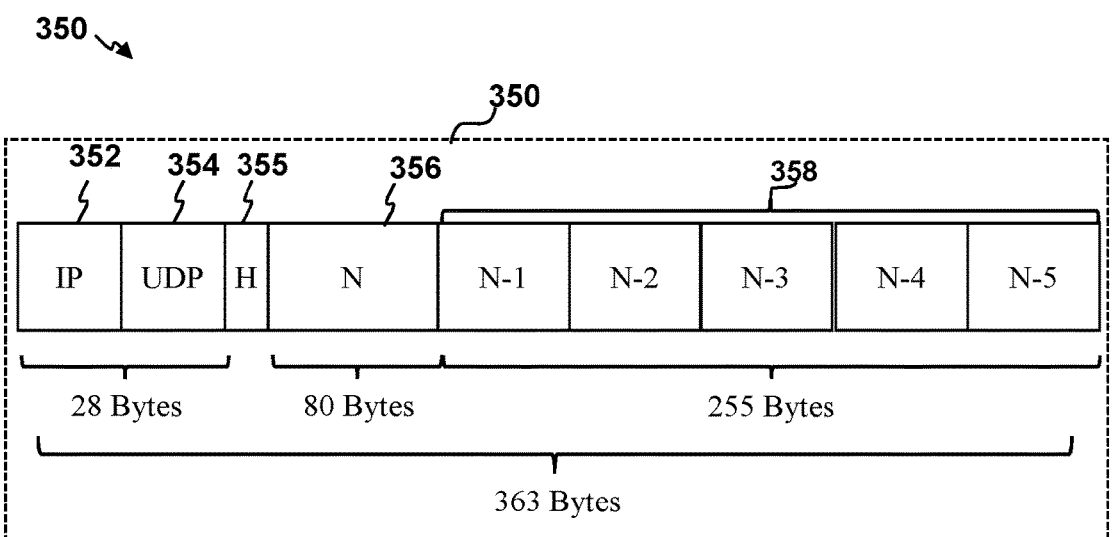
FIG. 3B is a block diagram illustrating a structure of data packets according to an implementation of forward error correction in accordance with aspects of the present disclosure.

FIGS. 3A-3B compare existing forward error correction and with the one disclosed in this specification. In an existing forward error correction scheme 301, known as Reed-Solomon, several packets configured as depicted in FIG. 3A are sent to the receiver. First, a packet 310 comprising of an IP header 312, a UDP header 314, and a byte data payload 316 corresponding to a frame of content are sent to the receiver across a network. In the illustrated example, the IP header and UDP header collectively account for 28 bytes of the packet and the payload accounts for 80 bytes. Shortly after the source packet 310 is sent, e.g., within 10 milliseconds of the source packet 310 being sent, two identical FEC packets 320 and 330 are sent to the receiver. The FEC packets 320, 330 respectively include IP headers 322, 332, UDP headers 324, 334, and payloads 326, 336. In the illustrated example, the IP headers 322, 332 and UDP headers 324, 334 account for 28 bytes of the FEC packets 320, 330 and the payloads 326, 336 account for 80 bytes of the FEC packets 320,330. In the case where the receiver does not get the source packet 310, the frame can be replaced by either FEC packet 320 or 330. In this scheme, three separate packets are sent to the receiver for processing and reconstruction of frames.

FIG. 3B illustrates a forward error correction scheme 350 according to an aspect of the present disclosure. The forward error correction scheme 351 is particularly useful in stereo audio transmission. According to this scheme, a data packet 350 includes an IP header 352, UDP header 354 and encoded information 356 corresponding to a current frame N of a sequence, which is encoded at a first bitrate. An additional header 355 shown between the UDP header 354 and the payload (encoded information for current frame N), may contains the frame number, and information about the source and FEC encoding bitrates. The data packet 350 also include encoded information 358 corresponding to previous frames N−1, N−2, N−3, N−4, N−5 of the sequence. The previous frames are encoded at a second bitrate that is less than the first.

The forward error correction scheme 351 has greater robustness in the case of bursty loss (~50 milliseconds) as the time interval covered by the source frame N and FEC frames N−1, N−2, N−3, N−4, N−5 is increased, meaning larger gaps in connection can be tolerated while still ensuring that a given frame in the sequence can be reproduced. Additionally, if a sender 201, network or memory storage 202, or receiver 203 has some limit to the number of packets it can process, then the scheme 351 can use fewer data packets to provide error correction. In the example depicted in FIG. 3B the headers 352, 354 account for a total of 28 byes, the encoded source frame information 356 accounts for 80 bytes and the encoded FEC frame information 358 accounts for 255 bytes (51 bytes for each FEC frame) for a total of 363 bytes. This is similar to the 324 bytes of data that Reed-Solomon forward error correction scheme 301 requires. For this particular example, the ratio of source frame data to FEC frame data per frame in the packet 350 is about 1.57.

Figure 4:
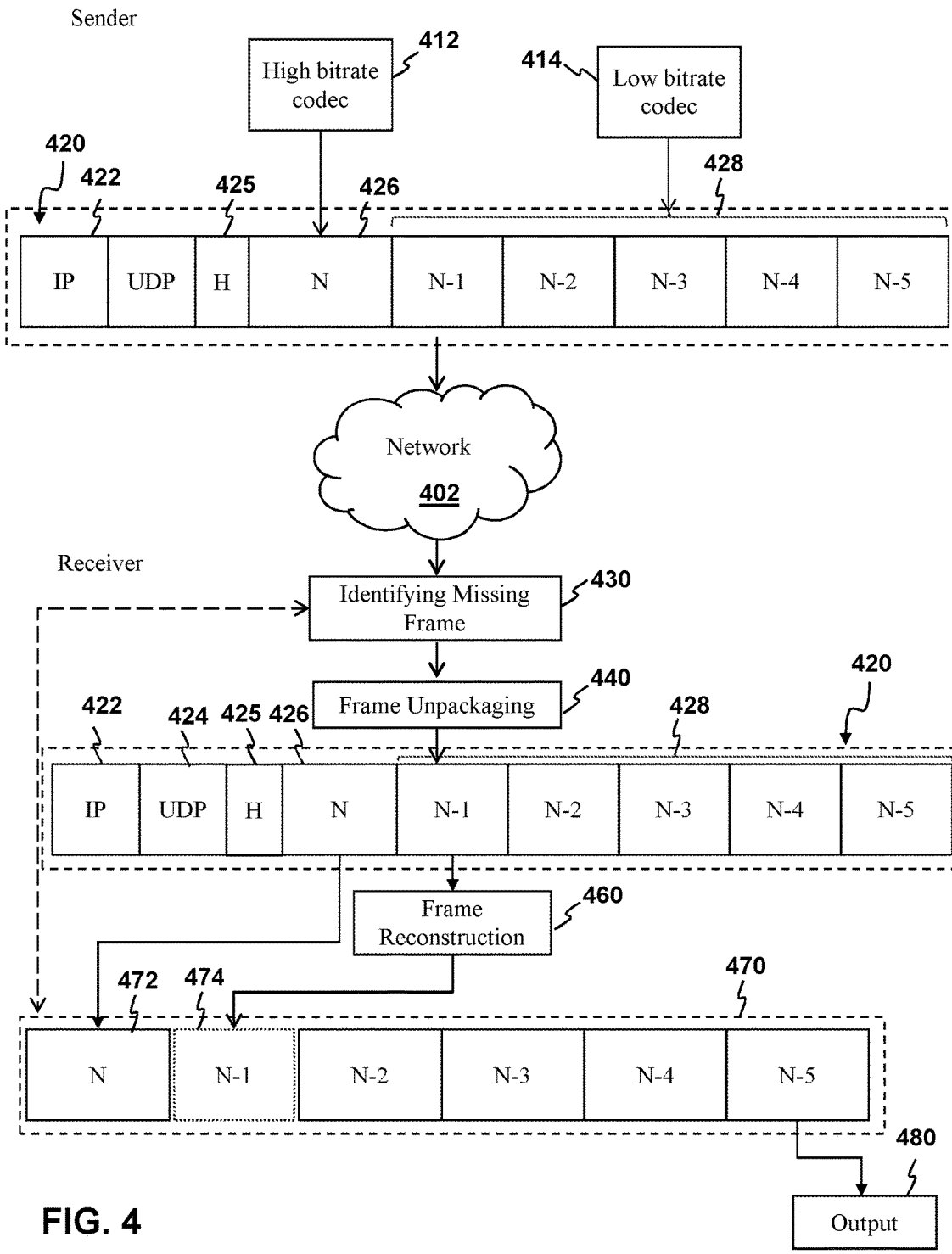
FIG. 4 is a flow diagram of a detailed example of forward error correction in streaming data transmission according to certain aspects of the present disclosure.

FIG. 4 depicts a particular an example of an implementation of overall process flow in accordance with aspects of the present disclosure. A high bitrate codec 412 and a lower bitrate codec 414 are used to generate a source frame 426 and a set of FEC frames 428. In particular reference to the source frame generator 412 and FEC frame generator 414, the disclosed could implement two instances of the same codec to encode the source frame and FEC frames into corresponding source frame data 426 and FEC frame data 428. One could also implement the disclosed using two separate hardware codecs, two separate software codecs, a combination of hardware codec and software codec for source frame and FEC frame generation respectively, or vice versa. Additionally, there could be further combinations of codecs that those skilled in the art could create that would be consistent with these teachings.

The encoded frame data 426, 428 is packaged into a data packet 420 which includes an IP identification header 422 and a UDP header 424 in addition to the encoded frame data. The packet 420 is sent across a network 402. An additional header 425 shown between the UDP header 424 and the payload (encoded information for current frame N), may contains the frame number, and information about the source and FEC encoding bitrates. While FIG. 4 specifically depicts transmission of the encoded data over a network 202, the disclosed also encompasses implementations where the packets 420 are stored in some form of memory such as a hard drive, CD, flash drive, or other forms of memory rather than being transmitted. The disclosed also encompasses implementations where the data packets 420 are both stored in memory, for example in a temporary memory buffer or permanent storage mediums such as a hard drive, CD, or flash drive, and also transmitted across a network 202.

Transmission over the network 402 can include any form of wireless communication including WiFi. As discussed in relation to FIG. 1, transmission over a network 402 can be periodically unreliable, and so not all packets 420 sent may subsequently arrive at the receiver 403. In particular, wireless communication can be susceptible to bursty loss, wherein multiple packets in a sequence are lost. This loss may involve, e.g., interruptions in transmission on the order of 50 milliseconds. As discussed elsewhere in the disclosure, existing forward error correction methods are not as robust during occurrences of bursty loss.

Upon successfully receiving, the receiver may examine the data packet 420 as indicated at 430 to see determine whether it contains data related to a missing frame 474. In this particular implementation, information about which frame or frames are missing may be determined by examining an output frame queue 470. For example, each frame may have sequence information in its header that identifies the frames position in a sequence. By examining the sequence information for each frame in the queue 470, the receiver may determine which frame or frames are missing, if any. A codec on the receiver side 440 decodes the data packet 420. In this particular example, the decoded source frame 456 is successfully received and is thus added to the output frame queue 470. The decoded FEC frames 458, and in particular the FEC frame 459 associated with a missing frame 474 in the frame queue, undergo a frame reconstruction process 460 to generate a new output frame that is then added to the queue 470. Ultimately, the output frames in the queue 470 are sent to output 480, e.g., by presentation with an output device, such as a speaker in the case of audio frames or a visual display in the case of video frames.

Figure 5:
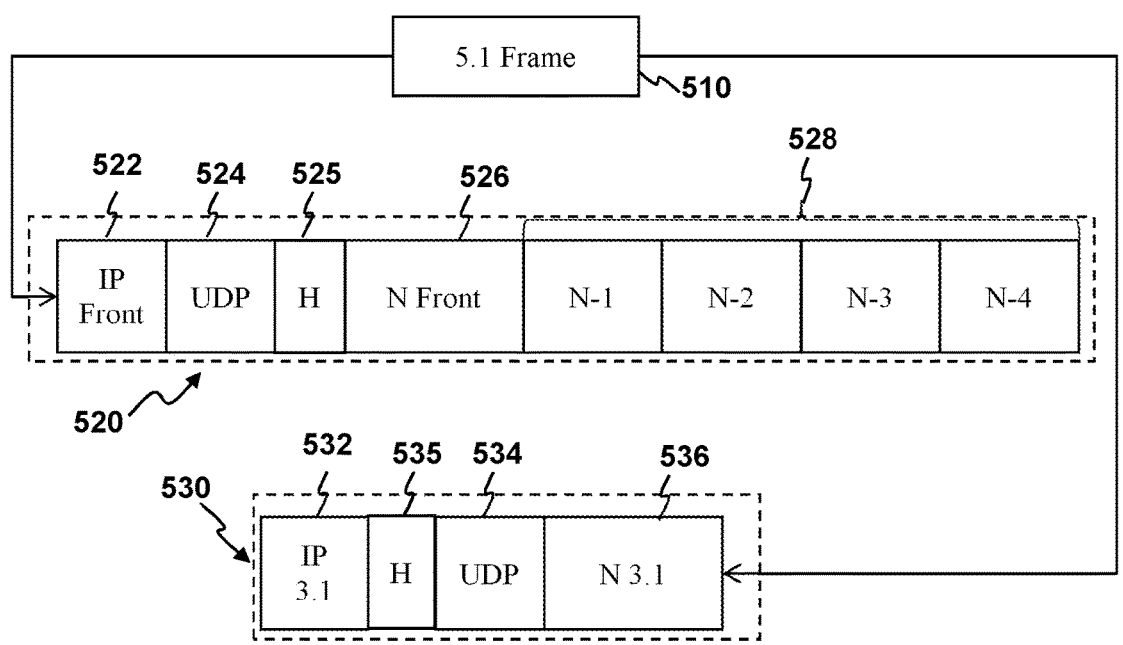
FIG. 5 is a block diagram of a data packet structure useful in implementing error correction in the context of a Surround Sound transmission in accordance with certain aspects of the present disclosure.

FIG. 5 illustrates one implementation of the packet structure, particularly for applying aspects of the present disclosure to surround sound audio, such as Dolby 5.1 surround sound. Frame information for Dolby surround sound includes information for 6 separate channels: front left (FL), front right (FR), surround left (SL), surround right (SR), center (C), and low frequency effects (LFE). According to the implementation depicted in FIG. 5, the FL and FR channels are considered the most important channels and the packaging of source frame data and FEC frame data is configured to take this into account. It is noted however, that the teachings of the implementation in FIG. 5 can also be applied to other sound systems with multiple channels.

In the case of a frame 510 associated with audio for a Dolby 5.1 Surround sound system, the data for the frame is split into two separate packets 520 and 530 that are sent nearly or exactly simultaneously from the sender 201 across the network 202 (or, as discussed elsewhere, entered into memory) to the receiver 203. One packet 520 and contains an IP identification header 522, a UDP header 524, and a payload that includes encoded information corresponding to source frame information 526 for the 2 front channels (FL and FR) of a current frame N of a sequence of frames and FEC frame information 528 corresponding to previous frames N−1, N−2, N−3, and N−4 of the sequence. An additional header 525 shown between the UDP header 524 and the payload (encoded information for current frame N), may contains the frame number, and information about the source and FEC encoding bitrates. The FEC frame information 528 contains data from which all 6 channels of audio can be reconstructed. Encoding the FEC frames 528 can include using Dolby Pro Logic Encoding, which enables the 6 channels of audio information to be encoded into 2 channels, referred to herein as the Left Channel and the Right Channel. This particular implementation has the advantage of reducing the bandwidth and memory requirements of the transmitted packet. Generally, the equations for the Pro Logic encoding of audio samples, are as follows:

Left Channel=FL+$s$*(SL+SR)+$c$*C+$c$*LFE and

Right Channel=FR−$s$*(SL+SR)+$c$*C+$c$*LFE, where $s$=0.5 to 1.0
$c$=0.707
FL/FR=Front left/right channel
SL/SR=Surround left/right channel
C=Center channel
L=Low frequency effects channel Information encoded in the manner described above may be decoded on the receiver side to extract all 6 channels of information, e.g., as described below. One skilled in the art can adapt other existing encoding and decoding techniques for 5.1 audio to the teachings disclosed herein.

The second packet 530 contains a separate IP identification 532 and UDP heading 534, as well as a payload including encoded source frame information 536 for the remaining four channels (SL, SR, C, and LFE). No FEC frames are contained in the second packet 530. Furthermore, no FEC frames need to be generated for the remaining four channels. Separating the source frame into separate packets allows for each packet to be smaller and enables more robust frame error correction in the case of lost packets. By separating the front channels and the 3.1 channels, the receiver system can reconstruct the front channels from the 3.1 channels if the front channel packet is lost or reconstruct the 3.1 channels from the FEC part of the front channels packet if the 3.1 channel packet is lost.

The packet arrangement in FIG. 5 can be used in place of the single data packet 420 in the flow depicted in FIG. 4. The method depicted in FIG. 2 and FIG. 4 generally conforms to the specific implementation of the disclosed invention for 5.1 audio. The particular implementation discussed could handle error correction differently depending on which frames reached the receiver.

Should the data packet 520 containing the source frames for the FL and FR channels not reach the receiver, then the computing system on the receiving end could reconstruct those channels from the FEC frames of a subsequently received packet.

If the receiver system receives stereo but has a 5.1 audio capability, it can do upmixing of the Left and Right channel signals to generate the other 3.1 channels. The previously described equations for doing the upmixing are included here:

$C=c*(Lt+Rt)$ $L=c*(Lt+Rt)$ and apply a low_pass_filter $SL=s*(Lt-Rt)$, time delayed and phase-shifted+90 degrees $SR=s*(Lt-Rt)$, time delayed and phase-shifted−90 degrees $s$=0.5 to 1.0
$c$=0.707

One skilled in the art could apply similar sets of previously invented equations to convert between other audio systems including but not limited to mono and 7.1 surround sound.

Reconstruction can also include using both FEC frames and the 3.1 channel source frames to recover the FL and FR channels. If both the FEC frames and 3.1 channel source frames are used to reconstruct the frames, one could potentially get a higher resolution output frame than if only one or the other was used.

By way of example, and not by way of limitation, 5.1 audio data may be constructed with both FEC frames (Lt/Rt) and 3.1 data (SL/SR,C,L) as follows.

$FL=Lt-s*(SL+SR)-c*C-c*L$ $FR=Rt+s*(SL+SR)-c*C-c*L$ $s$=0.5 to 1.0
$c$=0.707

Should the data packet 530 containing the source frames for the SL, SR, C, and LFE channels not reach the receiver, then one could reconstruct those channels from the FEC frame information of a subsequent packet, which contains the encoded 3.1 channel frame data. In this case, one must decode the Pro Logic encoded FEC file using the following equations:

$C=c*(Lt+Rt)$ $L=c*(Lt+Rt)$ and apply a low_pass_filter $SL=s*(Lt-Rt)$, time delayed and phase-shifted+90 degrees $SR=s*(Lt-Rt)$, time delayed and phase-shifted−90 degrees $s$=0.5 to 1.0
$c$=0.707

One skilled in the art could apply similar sets of previously invented equations to convert between other audio systems including but not limited to mono and 7.1 surround sound.

Should both data packets 520 and 530 not reach the receiver, all of the channel information may be reconstructed from FEC frames that are subsequently sent and received. The relevant reconstruction equations (using the same abbreviations as before) are as follows:

$FL=Lt$ $FR=Rt$ $C=c*(Lt+Rt)$ $L=c*(Lt+Rt)$ and apply a low_pass_filter $SL=s*(Lt-Rt)$, time delayed and phase-shifted+90 degrees $SR=s*(Lt-Rt)$, time delayed and phase-shifted-90 degrees s=0.5 to 1.0
c=0.707

One skilled in the art could apply similar sets of previously invented equations to convert between other audio systems including but not limited to mono and 7.1 surround sound.

Should both data packets 520 and 530 arrive, no reconstruction is necessarily needed, and the data from the packets can be combined to form the output frame.

An implementation that processes either stereo or some other many-channeled audio system can also be adapted to be able to process audio in one system on the sender side and store or output the audio in another system at the receiver. Such an implementation could also allow for dynamic switching between surround sound and stereo encoding.

One particular implementation is as follows. If the source audio generated by the system on the sender side is originally stereo while the output to be generated on the receiver side is to be 5.1 surround sound, the sender system may treat the audio as stereo with only two channels and use a procedure such as the one outlined in FIG. 4. The receiver system would then have the option of outputting stereo or upmixing the frame information into 5.1 using the same equations to get the received data into the right audio system. If the source audio on the sender side is 5.1 surround sound but the receiver system can only process stereo, or the send system is limited to sending stereo due to dynamic adjustments due to bandwidth constraints or limitations of the output system, one can override the normal source frame with a Pro Logic encoded frame (carrying information on all 5.1 channels), so that the stereo audio stream carries Pro Logic encoded source and FEC frames. This enables reconstruction either in stereo or in 5.1 on the receiving side depending on output limitations. The packet structure would be the one shown in FIG. 5. One could implement a notification between sender and receiver about whether the audio being sent is surround sound or stereo in conjunction with the described procedure. This notification may be sent via a separate data packet over a control channel, may be included in the header of the data packets sent, or may be sent through some other means one skilled in the art could devise.

One skilled in the art could apply the teachings of the disclosed application to other cases where audio from the sender has varying channels than the output on the receiver side. One skilled in the art could construct data packet arrangements for other audio systems, that include but are not limited to stereo and Dolby 7.1 surround sound, and that conform to and are compatible with the teachings disclosed herein.

The above components may be implemented in hardware, software, firmware, or some combination thereof.

While the above is a complete description of the various illustrative implementations of the present disclosure, it is possible to use various alternatives, modifications and equivalents. Therefore, the scope of the present invention should not be construed to be limited by the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or-step-plus-function limitations, unless such a limitation is explicitly recited in a given claim using the phrase "means for" or "step for."

What is claimed is:

1. A method for encoding and transmitting frames with forward error correction (FEC), the method comprising:
receiving or generating a plurality of unencoded frames including a current frame in a sequence and one or more previous frames in the sequence;
encoding the current frame at a first bitrate to generate one or more encoded source frames;
encoding the one or more previous frames at a second bitrate that is lower than the first bitrate to generate one or more encoded FEC frames;
packetizing the one or more encoded source frames and the one or more encoded FEC frames into one or more data packets; and
storing the one or more data packets in a memory or transmitting the one or more data packets over a data network.

2. The method of claim 1, wherein a ratio of the first bitrate to the second bitrate is between about 1 and about 10.

3. The method of claim 1, wherein the plurality of unencoded frames includes one or more audio frames.

4. The method of claim 1, wherein transmitting the one or more data packets over a data network includes transmitting the one or more data packets over a wireless link.

5. The method of claim 1, wherein packetizing the one or more encoded source frames and the one or more encoded FEC frames includes placing sequence information into each data packet of the one or more data packets, wherein the sequence information specifies a corresponding location in the sequence for the one or more encoded source frames and the one or more encoded FEC frames.

6. The method of claim 1, wherein packetizing the one or more encoded source frames and the one or more encoded FEC frames includes placing sequence information into a header of each data packet of the one or more data packets, wherein the sequence information specifies a corresponding location in the sequence for the one or more encoded source frames and the one or more encoded FEC frames.

7. The method of claim 1, wherein packetizing the one or more encoded source frames and the one or more encoded FEC frames includes placing sequence information into each data packet of the one or more data packets, wherein the sequence information specifies a corresponding location in the sequence for the one or more encoded source frames and the one or more encoded FEC frames, wherein the sequence information includes any one or more of the following: a number of encoded FEC frames in a payload of the given data packet, the first bitrate, the second bitrate, which encoded frame in the payload corresponds to the source frame and which encoded frame within the payload corresponds to a FEC frame, or a sequence identifier for the encoded source or FEC frames within the payload.

8. The method of claim 1, wherein the one or more data packets include one or more Uniform Datagram Protocol (UDP) packets.

9. The method of claim 1, wherein storing the one or more data packets in a memory or transmitting the one or more data packets over a data network includes storing the one or more data packets in the memory and transmitting the one or more data packets over the data network.

10. The method of claim 1, wherein storing the one or more data packets in a memory or transmitting the one or more data packets over a data network includes transmitting the one or more data packets over the data network, the method further comprising determining a duration of bursty loss for transmission over the data network.

11. The method of claim 1, wherein storing the one or more data packets in a memory or transmitting the one or more data packets over a data network includes transmitting the one or more data packets over the data network, the method further comprising determining a duration of bursty loss for transmission over the data network and wherein encoding the one or more previous frames at the second bitrate that is equal to or lower than the first bitrate to generate the one or more encoded FEC frames includes encoding a sufficient number of previous frames to cover the determined duration of bursty loss for transmission over the data network.

12. The method of claim 1, wherein encoding the current frame at a first bitrate to generate the one or more encoded source frames includes encoding the current frame with a first instance of a codec and wherein encoding the one or more previous frames at a second bitrate that is equal to or lower than the first bitrate to generate one or more encoded FEC frames includes encoding the one or more previous frames with a second instance of the codec.

13. The method of claim 1, wherein the plurality of unencoded frames includes one or more video frames.

14. The method of claim 1, wherein the plurality of unencoded frames includes one or more frames of an input stream from a game interface.

15. The method of claim 1, wherein the plurality of unencoded frames includes one or more audio frames, wherein each of the one or more audio frames includes information corresponding to two or more audio channels.

16. The method of claim 1, wherein the plurality of unencoded frames includes one or more audio frames, wherein each of the one or more audio frames includes information corresponding to a left channel and a right channel.

17. The method of claim 1, wherein the plurality of unencoded frames includes one or more audio frames, wherein each of the one or more audio frames includes information corresponding to a left channel, a right channel, and one or more additional channels.

18. The method of claim 1, wherein the plurality of unencoded frames includes one or more audio frames, wherein each of the one or more audio frames includes information corresponding to a left channel, a right channel, and one or more additional channels, wherein encoding the current frame includes encoding information corresponding to the left and right channels and the one or more additional channels at the first bitrate and wherein packetizing the one or more encoded source frames includes placing the encoded information corresponding to the left and right channels into one or more first data packets and placing the encoded information corresponding to the one or more additional channels into one or more second data packets.

19. The method of claim 1, wherein the plurality of unencoded frames includes one or more audio frames, wherein each of the one or more audio frames includes information corresponding to a left channel, a right channel, and one or more additional channels, wherein encoding the current frame includes encoding information corresponding to the left and right channels and the one or more additional channels of the current frame at the first bitrate, wherein encoding the one or more previous frames as FEC frames includes encoding information corresponding to a combination of the left channel, right channel, and one or more additional channels of the one or more previous frames at the second bitrate, wherein packetizing the one or more encoded source frames and the one or more encoded FEC frames includes placing the encoded information corresponding to the left and right channels for the current frame and the encoded information corresponding to the combination of the left channel, right channel, and one or more additional channels of the one or more previous frames into one or more first data packets and placing the encoded information corresponding to the additional channels of the current frame into one or more second data packets.

20. The method of claim 1, wherein the plurality of unencoded frames includes one or more audio frames, wherein each of the one or more audio frames includes information corresponding to a first left channel, a first right channel, a second left channel, and a second right channel, wherein encoding the current frame includes encoding information corresponding the first and second left channels and first and second right channels of the current frame at the first bitrate, wherein encoding the one or more previous frames as FEC frames includes encoding information corresponding to the combination of the first and second left channels and first and second right channels of the one or more previous frames at the second bitrate, wherein packetizing the one or more encoded source frames and the one or more encoded FEC frames includes placing the encoded information corresponding to the first left channel and first right channel for the current frame and the encoded information corresponding to the combination of the first and second left channels and first and second right channels of the one or more previous frames into one or more first data packets and placing the encoded information corresponding to the second left channel and second right channel of the current frame into one or more second data packets.

21. The method of claim 1, wherein the plurality of unencoded frames includes one or more audio frames, wherein each of the one or more audio frames includes information corresponding to a first left channel, a first right channel, a second left channel, a second right channel, and a center channel, wherein encoding the current frame includes encoding information corresponding the first and second left channels, the first and second right channels, and the center channel of the current frame at the first bitrate, wherein encoding the one or more previous frames as FEC frames includes encoding information corresponding to a combination of the first and second left channels, the first and second right channels, and the center channel of the one or more previous frames at the second bitrate, wherein packetizing the one or more encoded source frames and the one or more encoded FEC frames includes placing the encoded information corresponding to the first left channel and first right channel for the current frame and the encoded information corresponding to the combination of the first and second left channels, first and second right channels, and the center channel of the one or more previous frames into one or more first data packets and placing the encoded information corresponding to the second left channel, the second right channel, and the center channel of the current frame into one or more second data packets.

22. The method of claim 1, wherein the plurality of unencoded frames includes one or more audio frames, wherein each of the one or more audio frames includes information corresponding to a first left channel, a first right channel, a second left channel, a second right channel, a center channel, and a low frequency effects (LFE) channel, wherein encoding the current frame includes encoding information corresponding the first and second left channels, the first and second right channels, and the center channel of the current frame at the first bitrate, wherein encoding the one or more previous frames as FEC frames includes encoding information corresponding to a combination of the first and second left channels, the first and second right channels, the center channel, and the LFE channel of the one or more previous frames at the second bitrate, wherein packetizing the one or more encoded source frames and the one or more encoded FEC frames includes placing the encoded information corresponding to the first left channel and first right channel for the current frame and the encoded information corresponding to the combination of the first and second left channels, first and second right channels, the center channel, and the LFE channel of the one or more previous frames into one or more first data packets and placing the encoded information corresponding to the second left channel, the second right channel, and the center channel of the current frame into one or more second data packets.

23. A system, comprising:
a processor module;
a memory coupled to the processor, wherein the memory contains executable instructions configured to implement a method, the method comprising:
receiving or generating a plurality of unencoded frames including a current frame and one or more previous frames;
encoding the current frame at a first bitrate to generate one or more encoded source frames;
encoding the one or more previous frames at a second bitrate that is lower than the first bitrate to generate one or more encoded FEC frames;
packetizing the one or more encoded source frames and the one or more encoded FEC frames into one or more data packets; and
storing the one or more data packets in a memory or transmitting the one or more data packets over a data network.

24. A non-transitory computer readable medium having embodied therein computer readable instructions configured, to implement a method, the method comprising:
receiving or generating a plurality of unencoded frames including a current frame and one or more previous frames;
encoding the current frame at a first bitrate to generate one or more encoded source frames;
encoding the one or more previous frames at a second bitrate that is lower than the first bitrate to generate one or more encoded FEC frames;
packetizing the one or more encoded source frames and the one or more encoded FEC frames into one or more data packets; and
storing the one or more data packets in a memory or transmitting the one or more data packets over a data network.

* * * * *